July 21, 1964 P. J. MANCUSO, JR 3,142,041

CONTROL APPARATUS FOR DIGITAL COMPUTER

Filed June 25, 1959 2 Sheets-Sheet 1

INVENTOR

PETER J. MANCUSO, JR.

BY Edgar H. Kent ATT'Y

July 21, 1964 P. J. MANCUSO, JR 3,142,041

CONTROL APPARATUS FOR DIGITAL COMPUTER

Filed June 25, 1959 2 Sheets-Sheet 2

INVENTOR
PETER J. MANCUSO, JR.
BY Edgar H. Kent ATT'Y 3,142,041

CONTROL APPARATUS FOR DIGITAL COMPUTER

Peter J. Mancuso, Jr., New Paltz, N.Y., assignor to International Business Machines Corporation, New York, N.Y., a corporation of New York Filed June 25, 1959, Ser. No. 822,796

5 Claims. (Cl. 340—172.5)

Figure 1:
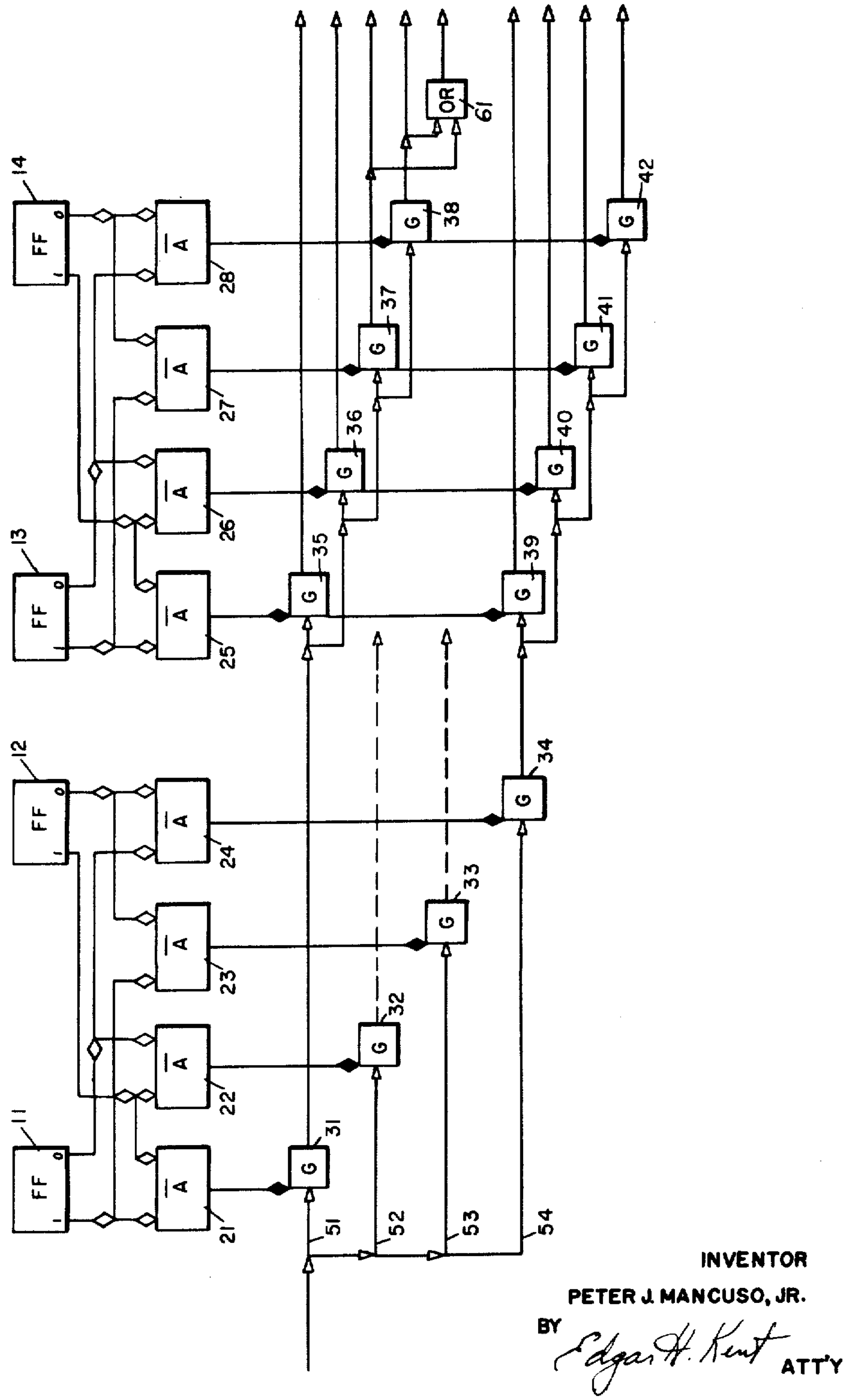

This invention relates to computing machines and more particularly it is concerned with the generation of command pulses in an electronic digital computer.

One of the operations that an electronic digital computer performs is the translation of digital signals representing instructions into a form suitable for initiating the various other computer operations required to execute the instructions. This mode of operation is generally called command generation by those skilled in the art since, in essence, it comprises the logical breakdown of instructions into related groups of commands. The commands generally take the form of pulses on selected command lines and by means of such pulses, selected computer circuits are energized in an ordered sequence.

Conventionally, a command generator in a digital computer comprises a large number of logical circuit devices arranged as a decoder of the signals representing the instructions. The decoder functions to supply a direct output voltage or level on a line that is uniquely determined by the sense of each instruction. These levels, in turn, condition gate circuits that are sensed by a series of timing pulses from a master signal generator or clock. In this way the gate circuits are adapted to transmit the required selection of time related command pulses.

With the advent of larger and more complex computers, characteristics of computer circuits such as the number of components used, their size, weight, power requirements, and so forth have become extremely important. Especially is this true of transistorized computers where usually both small size and high speed are primary design targets. The command generator is one computer organization which is greatly affected by circuit considerations of this kind because of the relatively large number of circuits that are needed for it.

It is an object of the present invention, therefore, to provide command generator circuitry that can be built with a minimum number of components to occupy a relatively small space.

It is another object to provide circuitry to generate command pulses more rapidly.

It is still another object to provide circuitry of the above-mentioned character which is easy to check for errors.

It is a further object of the invention to provide command generator circuitry that is flexible, that is, readily adaptable to use with instructions of optional length and commands of optional selection.

According to the invention, each instruction is logically divided into two parts. This approach, of course, is especially well suited to those computers which are organized on the basis of a division of the instruction logic into classes of instructions and variations within the classes. Associated with each part of the instruction is a group of bistable elements, and associated with each bistable element is a pair of output circuits that operate selectively to provide a direct output voltage according to the sense of the instruction signals. The class information provided by the bistable elements in the first group is effectively resolved by a first group of logical devices, each of which is adapted to provide a direct output voltage as an $\overline{\text{AND}}$ function of output voltages from the bistable elements in that group. Similarly, a second group of logical $\overline{\text{AND}}$ devices resolves the variation information represented by the output voltages from the second group of bistable elements. To this end, there is required one such logical $\overline{\text{AND}}$ device for each unique combination of output circuits that includes one output circuit from each element in the group.

The remainder of the command generating process is carried out with pulse circuitry according to the invention. Thus, each output voltage from a logical device in the first group conditions a corresponding gating device. These gates are sensed by timing pulses and when conditioned pass a pulse to a second group of gating devices. In the second group of gating devices there is at least one gate for each unique combination of an output voltage from a logical device in the second group and a pulse from a gate circuit in the first group. In this way an instruction is uniquely represented in both class and variation by a single output pulse from one of the second group of gates.

The novel features of the invention together with further objects and advantages thereof will become apparent from the following detailed description and the drawing to which it refers.

Figure 2:
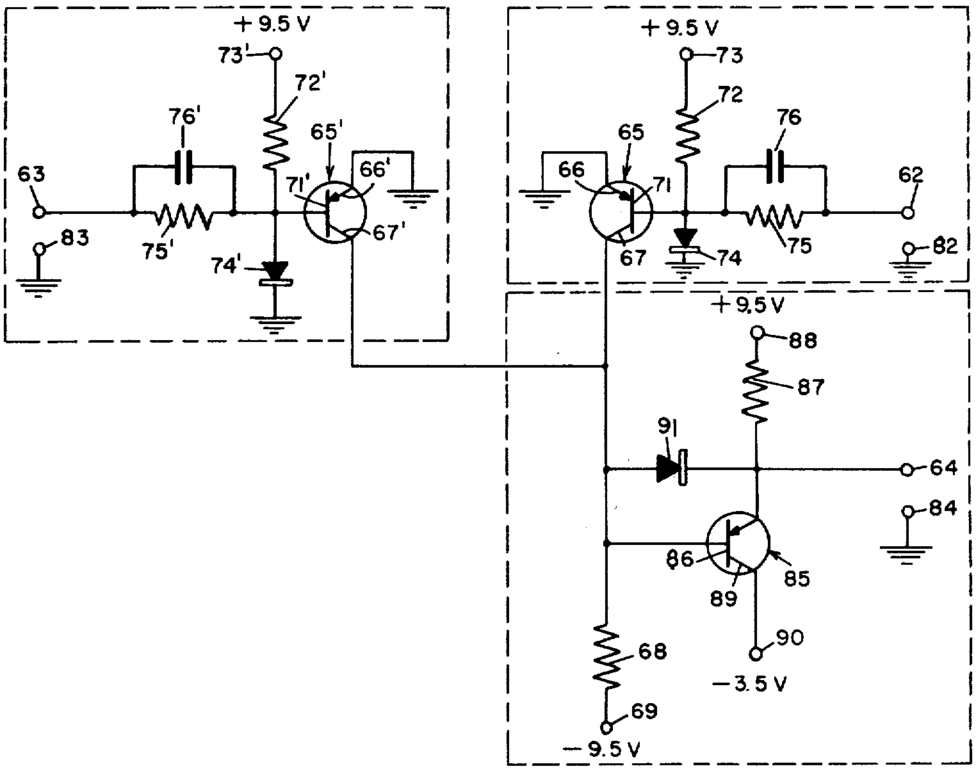

In the drawing:

FIG. 1 illustrates the apparatus according to the invention in block schematic form, the diamond-shaped arrowheads being used to distinguish lines carrying direct voltages from the lines carrying pulses, and FIG. 2 illustrates schematically $\overline{\text{AND}}$ devices such as are used in the apparatus.

With reference now to the drawing it will be observed that the apparatus according to the invention is comprised in the main of flip-flops 11–14, logical $\overline{\text{AND}}$ devices 21–28, and gating devices 31–42. Although the invention is by no means limited to use with special circuits to implement these devices, there are certain circuits that have been found to work especially well in this environment. In particular, a preferred circuit to implement the flip-flops is described in copending application Serial No. 745,886, now Patent No. 3,045,128, filed July 1, 1958 in the name of John W. Skerritt and entitled "Bistable Multivibrator." For the gating devices, a preferred circuit is described in copending application Serial No. 784,210, now Patent No. 3,079,511, filed December 31, 1958 in the names of Robert W. Averyt, Stephen Gardner, and Donald A. Harrison, and entitled "Pulsed Gate Circuit." Hereinafter a preferred type of $\overline{\text{AND}}$ device is described in detail.

According to the present invention, flip-flops 11, 12 provide signals representing classes of instructions, and flip-flops 13, 14 provide signals representing variations within the classes. Thus, each flip-flop has a ONE output circuit and a ZERO output circuit to provide selectively a direct voltage representing its state. Connected to the ONE outputs of flip-flops 11, 12 is the logical $\overline{\text{AND}}$ device 21, and connected to the ZERO outputs of these flip-flops is the logical $\overline{\text{AND}}$ device 24. The logical $\overline{\text{AND}}$ devices 22 and 23 are connected to the remaining combinations of ONE and ZERO outputs from the flip-flops 11, 12.

As shown, the logical $\overline{\text{AND}}$ devices 25–28 are arranged in like manner with respect to flip-flops 13, 14. Thus, the logical $\overline{\text{AND}}$ device 25 has as its inputs the ONE outputs from flip-flops 13, 14, while the logical $\overline{\text{AND}}$ device 28 has as its inputs the ZERO outputs from flip-flops 13, 14. To complete the arrangement, the logical $\overline{\text{AND}}$ device 26 is connected to the ONE output of flip-flop 14 and the ZERO output of flip-flop 13, while the logical $\overline{\text{AND}}$ device 27 has as its inputs the opposite combination, namely the ZERO output from flip-flop 14 and the ONE output from flip-flop 13.

Gate circuits 31–34 are connected to the outputs of logical devices 21–24, respectively, which selectively condition them. To sense the gates there are provided timing pulses from a timing signal generator or clock (not shown) on lines designated 51–54. Gates 35–42, on the other hand, are conditioned by the logical devices 25–28, respectively, and are sensed by pulses from the gates 31–34. The requisite command pulses are provided by gates 35–42.

Thus gates 35, 36, 37 and 38 are each connected to the output of gate 31 and supplied with conditioning levels from the logical devices 25, 26, 27 and 28 in that order. Similarly, gates 39, 40, 41 and 42 are each connected to the output of gate 34, while, as in the case of gates 35–38, logical devices 25–28 condition them. Similar groups of four gates each to be sensed by gates 32, 33 will ordinarily be provided to complete the selection of command pulses but these have not been shown in order to simplify the drawing. It will be understood, however, that the gates in each of these groups will likewise be conditioned by the output voltages from the logical devices 25–28.

Finally there has been shown a logical OR device 61 having as inputs the outputs from gates 37 and 38. Its purpose will become readily apparent from the description of how the apparatus operates, which follows.

In response to each instruction, flip-flops 11–14 are first cleared and then set in a conventional manner to one of their bistable states (ONE and ZERO). Depending upon the combination of states that the flip-flops 11, 12 are in, there is produced a single conditioning level to condition one of the gates 31–34. If both flip-flops 11, 12 are set at ZERO, then gate 31 will be conditioned through the inverse operation of $\overline{\text{AND}}$ device 21. As a consequence, this gate passes a pulse to four of the gates that are selectively conditioned by an output voltage level from logical devices 25–28, such as for example gates 35–38. Depending upon the states that flip-flops 13, 14 are in, therefore, one and only one of the logical devices in the 25–28 group will be adapted to raise a direct voltage level and hence only one of the gates 35–38 will be conditioned. It is the conditioned one of these gates that provides the command pulse required to uniquely represent the states of all of the flip-flops according to the overall sense of the instruction bits.

If there are certain internal computer functions each of which must be initiated in response to several instructions, that is, in response to a pulse alternatively from two or more of the gates 35–42, this may be taken care of very simply according to the invention by the provision of logical OR devices such as 61. Specifically, OR device 61 provides a command pulse that is common to the command pulses transmitted by gates 37, 38. Obviously so many other logical OR devices can be provided as are needed to combine output lines from the gates and thereby produce additional command pulses that are common to several instructions. The gating circuits described in the aforementioned copending application of Robert W. Averyt et al. will serve for such OR devices when modified to include an additional pulse input and with the D.C. amplifier portion of the circuit replaced by suitable biasing levels.

In FIG. 2 there is shown a transistor circuit with which it is preferred to implement the $\overline{\text{AND}}$ devices of FIG. 1. The input terminal pairs are labeled 62, 82 and 63, 83. The output terminal pair is labeled 64, 84. As shown by the dotted outline, the circuit is divisible into three parts, an emitter follower output stage and two common emitter amplifier stages which control the emitter follower stage in response to signals applied to the respective input terminal pairs. The amplifier stage with which input terminals 62, 82 are associated comprises a PNP transistor 65 having a grounded emitter 66 and a collector 67 which is connected through a resistor 68 to a reverse bias source of −9.5 volts at a terminal 69. The base 71 of the transistor is connected through a resistor 72 to a forward bias source of +9.5 volts at a terminal 73, and also the base is connected to ground through a diode 74. Diode 74 is used to permit the base of transistor 65 to recover following a positive transition at the input as well as prevent possible damage to the transistor that might otherwise occur as a result of excessive emitter-to-base voltages being developed momentarily during a change in the conductive state of the transistor. The input terminal 62 is connected to the base through the parallel combination of a resistor 75 and a capacitor 76. Capacitor 76 is used to minimize storage time and thereby increase the speed of operation of the circuit. As is apparent, the other common emitter amplifier stage is of identical design. Suffice it to say, therefore, that like elements in this amplifier stage have been designated by the same reference numerals with a prime added.

The emitter follower stage is formed with a PNP transistor 85 having its base 86 connected to the collectors of transistors 65 and 65′, and having its emitter connected through a resistor 87 to a source of forward biasing voltage of +9.5 at a terminal 88. The collector 89 of transistor 85 is connected to a reverse bias source of −3.5 volts at a terminal 90. Finally there is provided a diode 91 which is connected between the base of transistor 85 and its emitter. The function of the diode is to bypass the transistor when the common emitter stages are switched from a non-conductive state to a conductive state so that the output terminals will reflect the change immediately. The diode does not in any way impair the primary function of the emitter follower, namely to isolate the load from the common emitter stages during switching of the latter to a non-conductive state so that the effect of capacitive loading is minimized. The emitter follower also affords a low impedance for driving D.C. loads.

The logic of the $\overline{\text{AND}}$ circuit may be summarized as follows. When neither of the amplifier stages are conductive, the emitter follower stage will be on in saturation, thereby producing a voltage across the output terminals in the neighborhood of −3 volts. When either or both of the amplifier stages are conductive, the emitter follower stage conducts less strongly, with the result that there is substantially no voltage present at the output terminals. In other words, terminal 62 is very nearly at ground potential. To make one of the amplifier stages conductive, it is contemplated that a voltage in the neighborhood of −3.5 volts be applied to an input terminal pair, which lowers the potential of the base of one of the common emitter transistors, such as transistor 65. As a result, transistor 65 is, through the selection of proper values for the circuit resistances, caused to conduct strongly, which raises the potential of the collector from a value in the neighborhood of −3.5 to a value approaching ground potential. As a consequence, the emitter follower which was previously conducting in saturation is now conducting less strongly because of the increase, in a positive direction, of the potential on its base with respect to its emitter potential. With the transistor 85 more nearly turned off, the potential of its emitter, which is connected in common with the output terminal 64, is likewise caused to increase in a positive direction to a value approximating ground potential.

When −3.5 volts is removed from the input terminal pair 62, 82, the base potential of transistor 65 is caused to increase sufficiently to make the transistor essentially non-conductive. This causes its collector and hence the base of transistor 85 to undergo a decrease in potential (more negative), which causes transistor 85 to conduct in saturation.

Although the invention has been described in connection with an instruction of four bits, two of which have been regarded as designating an instruction class, and two of which have been regarded as designating a variation within the class, those skilled in the art will recognize this number of bits has been chosen to make the invention as easy to understand as possible and that ordinarily an expansion of the arrangement according to the invention will be required to accommodate instructions having a larger number of bits. Another modification that is obviously within the spirit and scope of the invention is the use of logical AND devices instead of $\overline{\text{AND}}$ devices, the former term as used herein embracing the latter term. Therefore, it will be understood that while the invention has been particularly shown and described with reference to a single preferred embodiment, various changes in form and details may be made therein without departing from the spirit and scope of the invention.

What is claimed is:

1. In an electronic digital computer operative in accordance with a stored program of binary coded instructions,
   command generating apparatus for channeling a serially generated group of timing pulses as commands in accordance with signals representative of said binary coded instructions including
   first and second storage registers for storing first and second portions respectively of a set of instruction signals,
   first and second logical means connected to said first and second registers respectively,
   each said logical means providing a single output signal level indicative of the decoded value of the instruction portion stored in the connected storage register,
   a first set of gates connected to said first logical means,
   a second set of gates connected to said second logical means,
   said second set of gates being arranged in a plurality of groups equal in number to the number of gates in said first set,
   each said gate having a conditioning signal input terminal,
   a sampling signal input terminal and an output terminal,
   each different output signal level from said first logical means being applied to the conditioning input terminal of a different gate in said first set,
   each different output signal level from said second logical means being applied to the conditioning input terminal of a different gate in any one group in said second set,
   means to apply a timing pulse simultaneously to the sampling input terminals of all the gates in said first set so that the gate in that set having a signal level applied to its conditioning input terminal from said first logical means will produce an output pulse at its output terminal,
   and means to apply said output pulse simultaneously to the sampling input terminals of all the gates in one group in said second set so that the gate in that group having a signal level applied to its conditioning input terminal from said second logical means will produce a command pulse at its output terminal to control the computer in accordance with the instruction signals stored in said first and second storage registers.

2. The apparatus as claimed in claim 1 and further including means to apply command pulses from different gates of one group in said second set through a common output circuit when different instructions generate the same command at the same time.

3. In an electronic digital computer operative in accordance with a stored program of binary coded instructions,
   each instruction including a class portion and a variation portion,
   each said portion having a plurality of bits,
   a command generator for channeling a serially generated group of timing pulses as commands for the control of said computer during each machine cycle in response to the bits in said class and said variation portions including
an instruction register comprising first and second groups of bistable devices for storing the bits representative of said class and variation portions of said instruction respectively,
means to transfer said class and variation instruction portions to said first and second groups of bistable devices respectively,
first logical means connected to said first group of bistable devices to provide a single output signal level indicative of the decoded value of the class portion of the instruction stored in said first group of bistable devices,
second logical means connected to said second group of bistable devices to provide a single output signal level indicative of the decoded value of the variation portion of the instruction stored in said second group of bistable devices,
a set of class gates connected to said first logical means,
a set of variation gates connected to said second logical means,
said variation gates being arranged in a plurality of groups equal in number to the number of class gates,
each said gate having a conditioning signal input terminal,
a sampling signal input terminal and an output terminal,
each different output signal level from said first logical means being applied to the conditioning input terminal of a different class gate,
each different output signal level from said second logical means being applied to the conditioning input terminal of a different variation gate in any one group,
means to apply a timing pulse simultaneously to the sampling input terminals of all the class gates so that the class gate having a signal level applied to its conditioning input terminal from said first logical means will produce an output pulse at its output terminal,
and means to apply said output pulse simultaneously to the sampling input terminals of all the variation gates in one group so that the variation gate in that group having a signal level applied to its conditioning input terminal from said second logical means will produce a command pulse at its output terminal to control the computer in accordance with the instruction stored in said instruction register.

4. In an electronic digital computer,
apparatus to produce command pulses in response to instruction signals and timing pulses,
said apparatus comprising first and second groups of output circuits,
each group of output circuits providing a plurality of direct output voltages representing a portion of said instruction signals,
first and second groups of logical devices,
each group of logical devices being connected to one group of output circuits and producing a single direct output voltage as an AND function of the output voltages provided by the output circuits connected to the group of logical devices,
first and second sets of gating devices,
each said gating device having a conditioning signal input terminal, a sampling signal input terminal, and an output terminal,
said first set of gating devices being connected to said first group of logical devices so that each said output voltage from said first group of logical devices is applied to the conditioning input terminal of only one gating device in said first set,
said second set of gating devices being arranged in a plurality of groups equal in number to the number of gating devices in said first set,
said second set of gating devices being connected to said second group of logical devices so that each said output voltage from said second group of logical devices is applied to the conditioning input terminal of only one gating device in any one group in said second set, means to apply a timing pulse simultaneously to the sampling input terminals of all the gating devices in said first set so that the gating device in that set having an output voltage applied to its conditioning input terminal from said first group of logical devices will produce an output pulse at its output terminal, and means to apply said output pulse simultaneously to the sampling input terminals of all the gating devices in one group in said second set so that the gating device in that group having an output voltage applied to its conditioning input terminal from said second group of logical devices will produce a command pulse at its output terminal.

5. In an electronic digital computer, apparatus for producing command pulses in response to instruction signals and timing pulses, said apparatus comprising first and second groups of bistable elements, each of said bistable elements having a pair of output circuits that are selectively operable to produce direct output voltages representing said instruction signals, means to transfer said instruction signals to said bistable elements for storage therein, first and second groups of logical devices, each said group of logical devices being connected to produce a single direct output voltage as an AND function of output voltages applied to said group of logical devices from said bistable elements, the logical devices in said first group being connected to the output circuits of said first group of bistable elements and the logical devices in said second group being connected to the output circuits of said second group of bistable elements, first and second sets of gating devices, each said gating device having a conditioning signal input terminal, a sampling signal input terminal, and an output terminal, said first set of gating devices being connected to said first group of logical devices so that each said output voltage from said first group of logical devices is applied to the conditioning input terminal of only one gating device in said first set, said second set of gating devices being arranged in a plurality of groups equal in number to the number of gating devices in said first set, said second set of gating devices being connected to said second group of logical devices so that each said output voltage from said second group of logical devices is applied to the conditioning input terminal of only one gating device in any one group in said second set, means to apply a timing pulse simultaneously to the sampling input terminals of all the gating devices in said first set so that the gating device in that set having an output voltage applied to its conditioning input terminal from said first group of logical devices will produce an output pulse at its output terminal, and means to apply said output pulse simultaneously to the sampling input terminals of all the gating devices in one group in said second set so that the gating device in that group having an output voltage applied to its conditioning input terminal from said second group of logical devices will produce a command pulse at its output terminal.

References Cited in the file of this patent

UNITED STATES PATENTS

| | | |
|---|---|---|
| 2,590,950 | Eckert et al. | Apr. 1, 1952 |
| 2,600,744 | Eckert et al. | June 17, 1952 |
| 2,627,039 | MacWilliams | Jan. 27, 1953 |
| 2,655,598 | Eckert et al. | Oct. 13, 1953 |
| 2,674,733 | Robbins | Apr. 6, 1954 |
| 2,807,002 | Cherin | Sept. 17, 1957 |
| 2,841,748 | Reynolds | July 1, 1958 |
| 2,844,811 | Burkhart | July 22, 1958 |
| 2,870,431 | Babcock | Jan. 20, 1959 |
| 2,884,616 | Fillebrown et al. | Apr. 28, 1959 |
| 2,907,877 | Johnson | Oct. 6, 1959 |
| 2,910,237 | Meyer | Oct. 27, 1959 |
| 2,914,248 | Ross et al. | Nov. 24, 1959 |
| 2,946,983 | Borders et al. | July 26, 1960 |
| 2,950,461 | Tryon | Aug. 23, 1960 |
| 2,965,298 | Ketchledge | Dec. 20, 1960 |
| 2,969,533 | Shanahan | Jan. 24, 1961 |

OTHER REFERENCES

Arithmetic Operations in Digital Computers, by Richards, 1955, page 76.